United States Patent [19]

Imaeda

[11] Patent Number: 5,639,540
[45] Date of Patent: Jun. 17, 1997

[54] THERMAL EXPANSILE SHEET

[75] Inventor: Mikio Imaeda, Bisai, Japan

[73] Assignee: Brother Kogyo Kabushiki Kaisha, Nagoya, Japan

[21] Appl. No.: 715,138

[22] Filed: Sep. 18, 1996

Related U.S. Application Data

[63] Continuation of Ser. No. 423,444, Apr. 19, 1995.

[30] Foreign Application Priority Data

Jul. 21, 1994 [JP] Japan .................................. 6-169632

[51] Int. Cl.⁶ .................................................. B32B 3/00
[52] U.S. Cl. ...................... 428/195; 428/187; 428/212; 428/304.4; 428/306.6; 428/315.5; 428/411.1; 428/913
[58] Field of Search .............................. 428/195, 187, 428/212, 304.4, 306.6, 315.5, 411.1, 913; 346/107.1

[56] References Cited

U.S. PATENT DOCUMENTS

| 4,268,615 | 5/1981 | Yonezawa . | |
|---|---|---|---|
| 4,330,785 | 5/1982 | Yabuta et al. | 346/1.1 |
| 5,122,430 | 6/1992 | Nishitsuji et al. | 430/110 |
| 5,249,000 | 9/1993 | Okabe et al. | 346/151 |

FOREIGN PATENT DOCUMENTS

| 034376 | 8/1981 | European Pat. Off. . |
| 376322 | 7/1990 | European Pat. Off. . |
| 61-72589 | 4/1986 | Japan . |
| 2-164528 | 6/1990 | Japan . |

*Primary Examiner*—William Krynski
*Attorney, Agent, or Firm*—Oliff & Berridge

[57] ABSTRACT

Hiragana characters and Chinese characters, as well as a Braille pattern, are formed on a thermal expansile sheet by the use of a thermal transfer ribbon by a thermal transfer unit. When only the portions of the thermal expansile sheet corresponding to a Braille pattern is exposed to light, only portions of the thermal expansile sheet corresponding to the Braille pattern are raised, whereby a Braille pattern is produced and the characters remain flat. The characters represent the meaning of the Braille pattern and function to discriminate the orientation of the thermal expansile sheet. Thus, it becomes easier for those who have no knowledge of Braille to discriminate the orientation of the sheet where Braille is formed.

18 Claims, 9 Drawing Sheets

THERMAL EXPANSILE SHEET

This is a continuation of application Ser. No. 08/423,444, filed Apr. 19, 1995, now abandoned.

BACKGROUND OF THE INVENTION

1. Field of the Invention

The present invention relates to a thermal expansile sheet.

2. Description of Related Art

Conventionally, a technique regarding a thermal expansile sheet is disclosed, for example, in U.S. Pat. No. 4,268,615. According to this technique, a desired image is first formed on the surface of a thermal expansile sheet using a material that is more optically absorptive than the thermal expansile sheet. Then, the surface is exposed to light. As a result of this, an area where the image is formed is heated and raised due to a difference in absorption.

Moreover, Japanese Unexamined Patent Publication No. 61-72589 discloses a technique in which an image is formed on an expandable recording member, using a material that is highly optically absorptive, by means of a thermal transfer method, and light is irradiated to the expandable recording member. Thus, an uneven pattern corresponding to the image is formed on the expandable recording body utilizing the optical absorption characteristics of the formed image.

The use of the above mentioned techniques makes it possible to make a desired uneven pattern on a sheet by a simple processing. The application of these techniques enables letters in Braille to be formed on a thermal expansile sheet.

However, when only Braille letters are formed on the sheet, it becomes impossible for those who have no knowledge of Braille to distinguish the top and bottom, i.e., the orientation of the Braille letters. For examples, Braille letters shown in FIG. 10A denote "Urashima Taro." The pattern in Braille shown in FIG. 10B is the pattern shown in FIG. 10A after being inverted and rotated 180°. However, those who have no knowledge of Braille would assume that the Braille letters shown in FIG. 10B are also meaningful.

In addition, even when the Braille letters are properly oriented at the time of the preparation, the correct orientation of the Braille letters will become uncertain if the Braille label is temporarily stored before being attached or if it is dropped. This may result in the Braille label being used upside down. In fact, upside-down Braille signs are often seen at railway stations or the like.

To avoid this, it becomes necessary for those who have knowledge of Braille to check the orientation every time a label in Braille is used, which results in considerably laborious work.

SUMMARY OF THE INVENTION

This invention is made to solve the foregoing drawbacks in the prior art, and a primary object of the present invention is to provide a thermal expansile sheet that allows those who have no knowledge of Braille to easily identify the orientation of letters in Braille.

According to the present invention, there is provided a thermal expansile sheet comprising a base layer having a first surface and a foaming layer disposed on the first surface of the base layer. The foaming layer includes a foaming material that generates gas upon heating, and the foaming material corresponding to a desired image foams upon heating and forms an expanded image therein. An orientation discriminating means for discriminating an orientation of the thermal expansile sheet is also provided in the thermal expansile sheet.

According to the above described thermal expansile sheet, since the orientation discrimination means is formed to distinguish the orientation of the thermal expansile sheet, proper orientation of the sheet is ensured. Thus, the thermal expansile sheet is prevented from being used upside down.

Further, as is apparent from the above description, since the orientation discrimination means is provided for discriminating the orientation of the thermal expansile sheet according to this invention, it is possible for those who have no knowledge of Braille to easily discriminate the orientation of the thermal expansile sheet. Whereby, it is possible to ensure that the thermal expansile sheet is prevented from being used upside down.

DETAILED DESCRIPTION OF PREFERRED EMBODIMENTS

Referring to the accompanying drawings, preferred embodiments in which a thermal expansile sheet is applied to the field of Braille is described hereunder.

Figure 1:
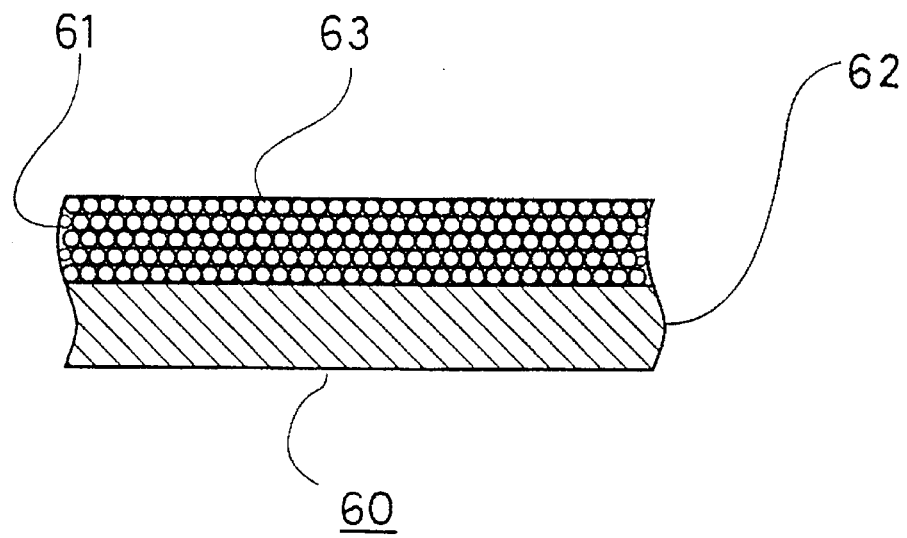
FIG. 1 is a cross sectional view of a thermal expansile sheet of one embodiment according to the present invention.

FIG. 1 shows a cross section of a thermal expansile sheet of the first embodiment. A thermal expansile sheet 60 comprises a base material 62 and a thermal expansile layer 61 laminated thereon.

The thermal expansile layer 61 is made by dispersing a foaming agent 63 in a thermoplastic resin. Foaming agents that evolve nontoxic gas as a result of thermal decomposition are preferably used as the foaming agent 63. Examples are bicarbonate such as sodium bicarbonate, various types of peroxide, and azo compounds such as diazoaminobenzene, aluminum paradicarboxylate and azobisisobutyronitrile.

A thermal expansile microcapsule having a diameter of 10–20 μm, for example, can also be used as the foaming agent 63. Preferably, volatile substances, having a low boiling point, such as propane and butane are encapsulated by a shell material consisting of polystyrene, polyvinyl chloride, polyvinylidene chloride, polyvinyl acetate, polyacrylic ester, polyacrylonitrile, polybutadiene, or copolymers thereof.

Such a foaming agent 63 is dispersed into a solution or emulsion of resin, which is used as a binder, using a known dispersion mixer such as a roll mill or a sand mill. The resultant solution or emulsion is applied over the base material 62 using a known coating apparatus. The base material 62 having the dispersion solution or emulsion thereon is dried, so that the thermal expansile layer 61 is obtained.

Thermoplastic resins such as vinyl acetate polymers and acrylic polymers are preferably used as the resin for use as a binder. When those thermoplastic resins are used, the thermoplastic resin will be thermally softened to form a stable foaming layer at the same time that the foaming agent 63 is thermally decomposed upon heating and gas is evolved or when the thermal expansile capsule thermally expands.

The required properties of the base material 62 are smoothness, water resistance, tensile strength, and rigidity, which prevents the thermal expansile layer 61 from inflating toward the base material side when the foaming agent 63 foams. Preferable examples having the above-described required properties are paper, synthetic paper such as polypropylene, and various types of plastic film such as polyethylene terephthalate (PET), polybutylene terephthalate (PBT). Among these base materials, when a PET film subjected to a foaming treatment and incorporating a large amount of bubbles therein is used as the base material, it is possible to raise an image with smaller energy because of its high heat insulating effect.

Figure 2:
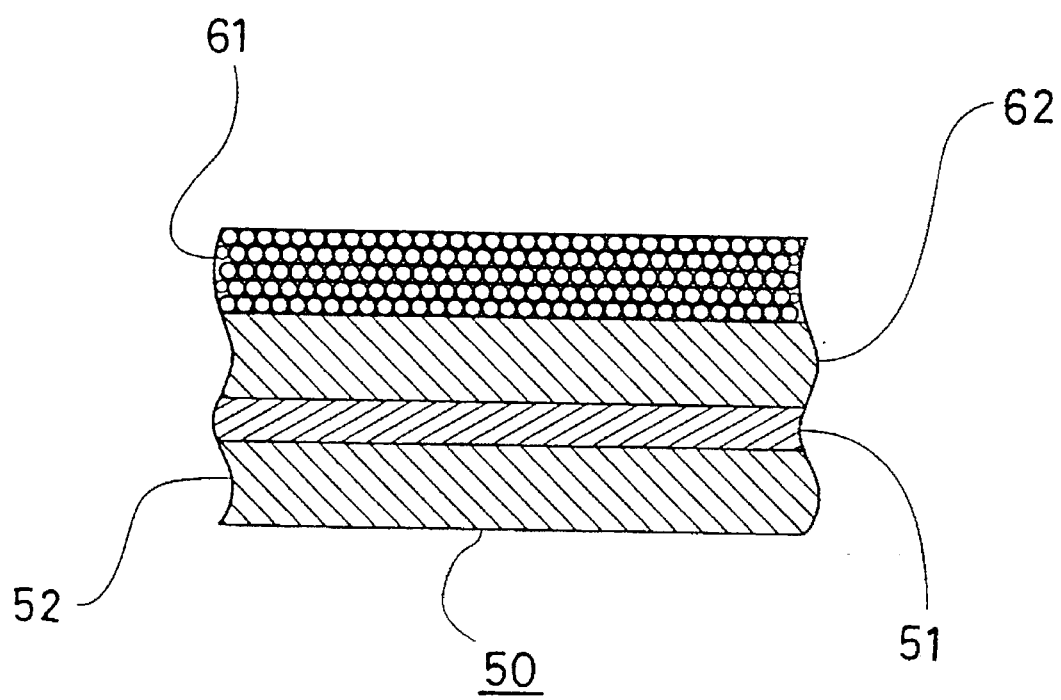
FIG. 2 is a cross sectional view of a thermal expansile sheet provided with an adhesive layer and a release paper.

FIG. 2 shows a cross section of another thermal expansile sheet of the second embodiment. As shown in FIG. 2, a thermal expansile sheet 50 consists of a pressure sensitive and adhesive layer 51 and a release paper 52 having a release layer (not shown), which is laminated on the adhesive layer 51. The adhesive layer 51 and the release paper 52 are provided on the opposite side of the base material 62 where the thermal expansile layer 61 is formed.

The adhesive layer 51 is made by the application of a coating fluid, consisting of an adhesive of wax, acryl, silicon or rubber dissolved into a solvent such as toluene or methyl ethyl ketone or emulsified, to the base material 62 using a known coating apparatus.

After the adhesive layer 51 has been formed on the base material 62, the release paper 52 is laminated onto the adhesive layer 51. The release paper 52 consists of a plastic film base material, such as paper, polypropylene, or PET, and a release layer made of silicon, polyethylene, PVA, or alkyd resin and formed on the plastic film base material. Particularly, silicon resins are preferably used.

Besides the preparation method set forth above, a thermal expansile sheet having the same form as the thermal expansile sheet 50 can be formed by laminating together the base material 62 coated with the thermal expansile layer 61 and the release sheet 52 having a release layer with the adhesive layer 51 coated on the release sheet 52, using similar materials. The thus obtained thermal expansile sheet can be handled in completely the same way as the thermal expansile sheet 50.

Subsequently, a method for preparing a thermal expansile sheet, in which the thermal expansile sheet 50 or 60 having the above-mentioned structure is used, is described with reference to FIGS. 3 and 4. Letters are formed in Braille on the upper surface of the thermal expansile sheet 50 or 60, whereby a thermal expansile sheet having a raised image is obtained.

Figure 3:
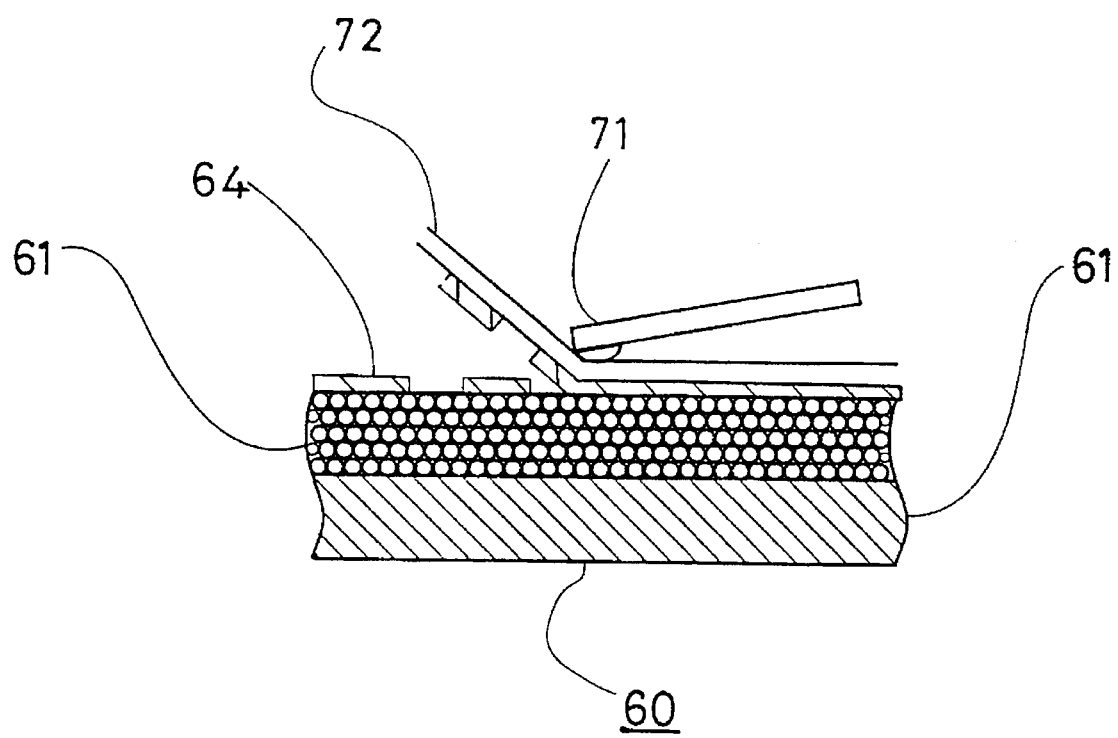
FIG. 3 is an explanatory view illustrating a step of thermally transferring an optically absorptive image to the thermal expansile sheet.

As shown in FIG. 3, for example, a thermal transfer ribbon 72 to be used in a thermal transfer recorder is superimposed on the thermal expansile layer 61 of the thermal expansile sheet 60. A thermal head 71 provided in the thermal transfer recorder is pressed against the rear surface of the thermal transfer ribbon 72. When the thermal head 71 is heated under the control of a control circuit (not shown) on the basis of an image signal, part of an ink layer on the thermal transfer ribbon 72 corresponding to the image is melted, and the melted ink is fused to the surface of the thermal expansile layer 61. After ink has been cooled and the thermal transfer ribbon 72 is separated from the thermal expansile layer 61, only an image formed with an ink layer of the thermal transfer ribbon 72 is transferred to the thermal expansile layer 61, whereby an image 64 is formed as an image on the thermal expansile layer 61.

Although the thermal head 71 of the thermal transfer recorder is used for forming an image on the thermal expansile layer 61, other methods of forming an image can be used. For example, a laser beam, whose intensity is modified on the basis of an image signal, can be used for scanning across the rear surface of the thermal transfer ribbon 72 to generate heat. As a result of this, the part of the ink layer of the thermal transfer ribbon 72 exposed to the laser beam having a strong intensity is melted, and the melted ink is fused to the surface of the thermal expansile layer 61.

Here, a material that generates heat upon absorption of light is used as ink for use with the thermal transfer ribbon 72. For example, when a black print image is desired, carbon black should be used. The carbon black possesses properties of absorbing light from visible light to near infrared rays and converting such light energy to heat.

On the other hand, when colored print images other than black one are necessary, known dye or pigment, for example, red, blue, yellow, or the like, is used with the ink. However, since the dye or pigment is less optically absorptive in the range of infrared rays, it is impossible to sufficiently convert light energy to heat. For this reason, it is necessary to cause the dye or pigment to be more optically absorptive in the range of infrared rays by appropriately mixing composite oxide mainly including tin, antimony, or indium oxide into the composition of ink. The optically absorptive image 64 is formed on the thermal expansile layer 61 of the thermally expansile sheet by the above-mentioned steps.

Figure 4:
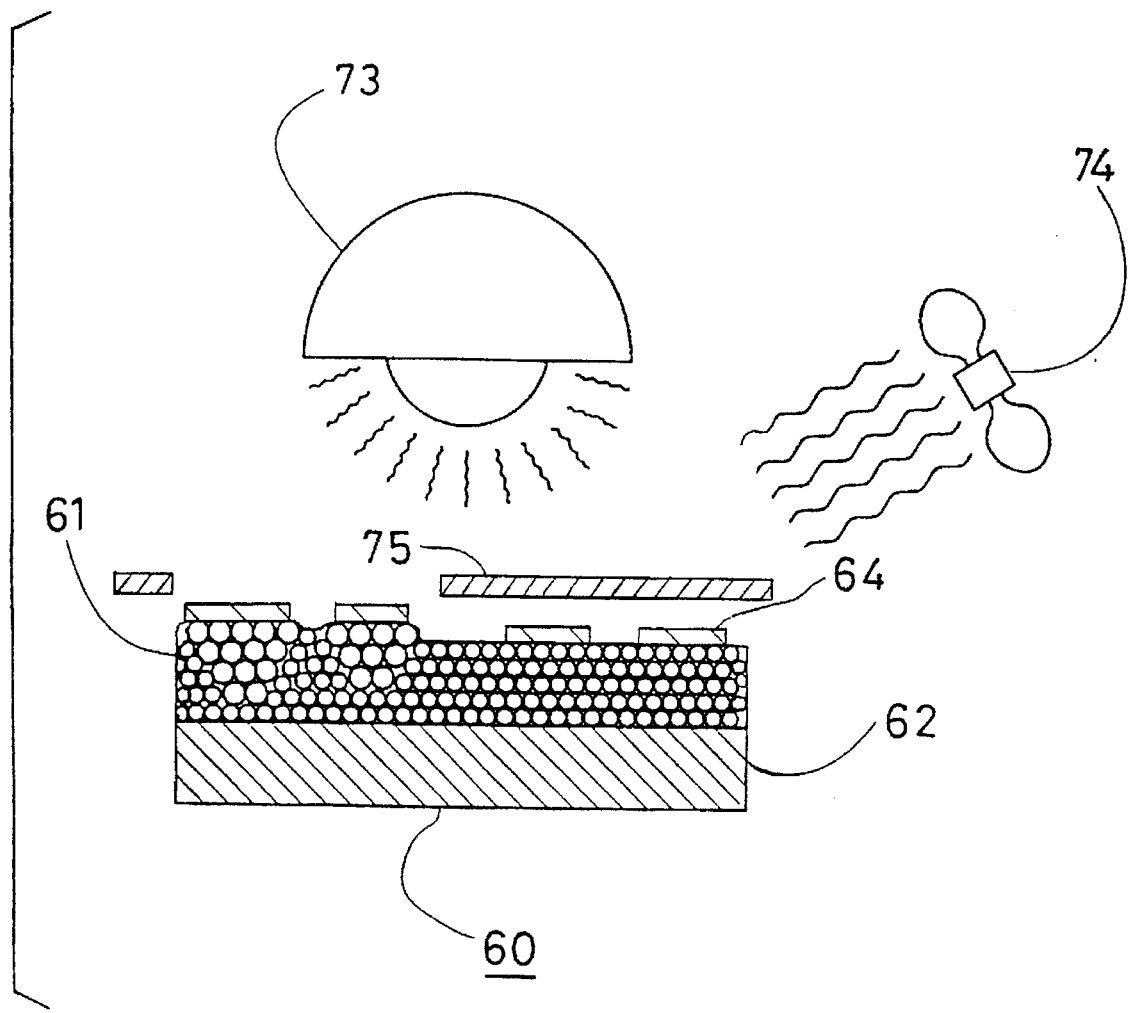
FIG. 4 is an explanatory view illustrating a step of raising the image formed on the thermal expansile sheet.

As shown in FIG. 4, the thermal expansile sheet 60 on which the optically absorptive image 64 is formed is exposed to light by the use of a lamp 73. Any lamp that can emit light ranging from visible light to infrared rays, such as a tungsten lamp, a halogen lamp or a xenon lamp, may be used as the lamp 73.

Upon exposure with the optically absorptive image 64 formed on the thermal expansile layer 61 to light from the lamp 73, the image 64 absorbs the light and converts the light to heat energy. For this reason, the thermal expansile layer 61 situated below the image 64 is heated. When the foaming agent 63 is used in the thermal expansile layer 61, the foaming agent 63 foams upon heating and decomposition, whereby the surface of the thermal expansile layer 61 is raised. Moreover, when a thermal expansile capsule is used in the thermal expansile layer 61, the surface of the thermal expansile layer 61 is raised as a result of expansion of the capsule. Thereby, a thermal expansile sheet, where a raised image is formed at the position corresponding to the image 64, is produced.

At this time, air is blown to the vicinity of the surface of the thermal expansile layer 61 by means of a fan 74 while the thermal expansile layer 61 is exposed to light from the lamp 73. Whereby, the temperature around the thermal expansile layer 61 is prevented from increasing. This makes it possible to increase a difference in temperature between the area that absorbs light to cause a temperature rise and the area that reflects light to prevent a temperature rise. For this reason, only a desired area of the thermal expansile layer 61 can be raised, and the resolution of an image can be improved.

Procedures for preparing a thermal expansile sheet provided with marks that enable the discrimination of orientation of the thermal expansile sheet will now be described employing the image forming method, as explained in detail, in which the thermal expansile sheet 50 or 60 is used.

Figure 5A:
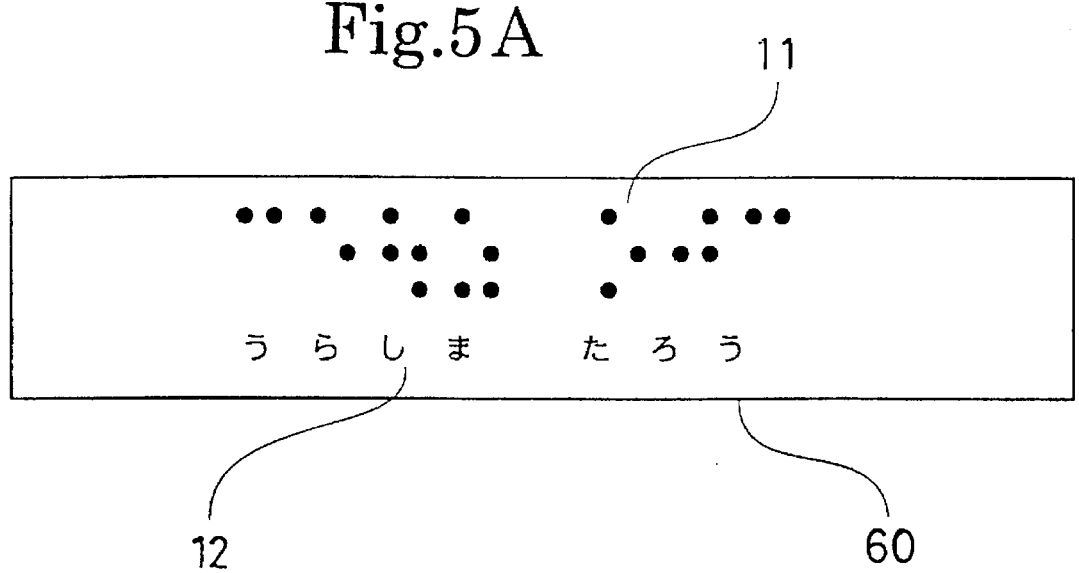
FIG. 5A is a schematic view showing an example of a thermal expansile sheet made according to the preferred embodiment.
Figure 10A:
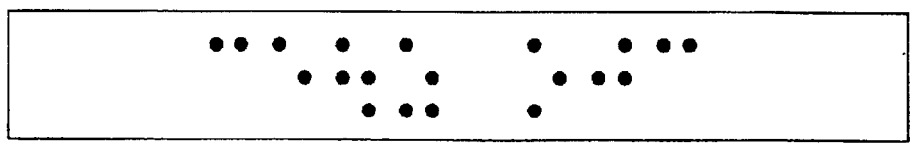
FIG. 10A is an explanatory view of a thermal expansile sheet according to related art.
Figure 10B:
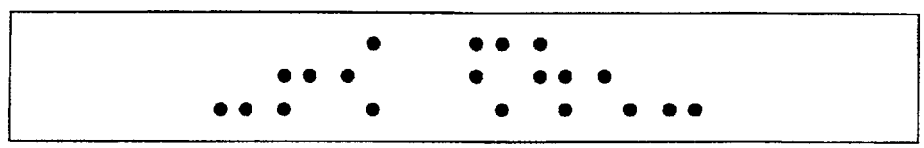
FIG. 10B is an explanatory view of a thermal expansile sheet according to related art.

FIG. 5A shows a thermal expansile sheet 60 in which the Braille pattern 11 shown in FIG. 10A denoting "Urashima Taro" and a hiragana (character) notation 12 of the "Urashima Taro" are provided on the thermal expansile sheet 60. Such a thermal expansile sheet 60 can be obtained by forming the Braille pattern 11 and the character notation 12 as the optically absorptive image 64 on the thermal expansile sheet 60 and by exposing the thermal expansile sheet 60 to light using the lamp 73. However, if the character notation 12 is also raised by the exposure to light, it is very confusing for blind people. Therefore, it is necessary to prevent the character notation 12 from rising. Accordingly, a shield plate 75 is provided between the area of the thermal expansile sheet 60 corresponding to the notation 12 and the lamp 73 to prevent the character notation 12 from the being exposed to light from the lamp 73. As a result of this, only the Braille pattern 11 is exposed to light, and the character notation 12 remains flat, whereby it is possible to raise only the Braille pattern 11.

In this way, since the Braille pattern 11 and the notation 12, representing the meaning of the Braille pattern, are formed on the same surface, it becomes possible to discriminate the orientation of the Braille pattern and represent the meaning of the Braille pattern. Accordingly, the notation 12 functions as the orientation discrimination mechanism.

The following method is also enables only the Braille pattern 11 to be raised.

Two types of ink, one type being optically absorptive in the range of infrared rays and the other type being not optically absorptive in the range of infrared rays, are prepared as ink for use in the thermal transfer ribbon 72 used in forming the image 64. The image 64 is formed by using the ink, being optically absorptive in the range of infrared rays, for the Braille pattern 11 and the other ink, being not optically absorptive, for the character notation 12. Thereby, even when the whole area of the thermal expansile sheet 60 is exposed to light without the use of the shield plate 75, only the Braille pattern 11, formed by the ink being optically absorptive in the range of infrared rays, is raised. Thus, optical irradiation processing can be carried out more easily.

To implement this method, two types of thermal transfer ribbon, one type using ink optically absorptive in the range of infrared rays and the other type using ink not optically absorptive, are used. Either of the ribbons appropriate for this purpose is used as required.

Figure 5B:
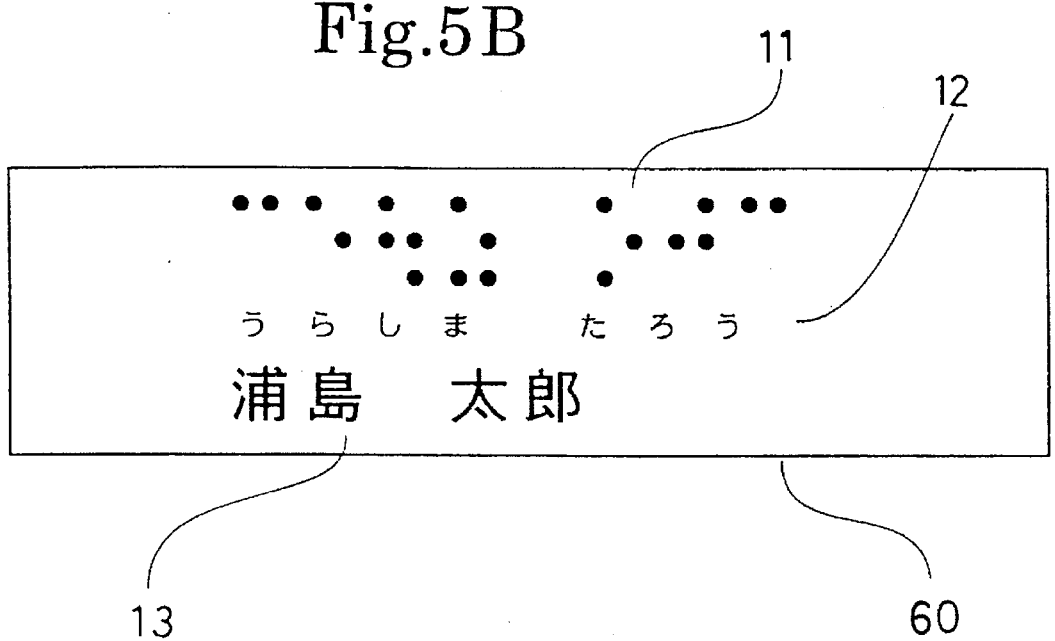
FIG. 5B is a schematic view showing an example of a thermal expansile sheet made according to the preferred embodiment.
Figure 6A:
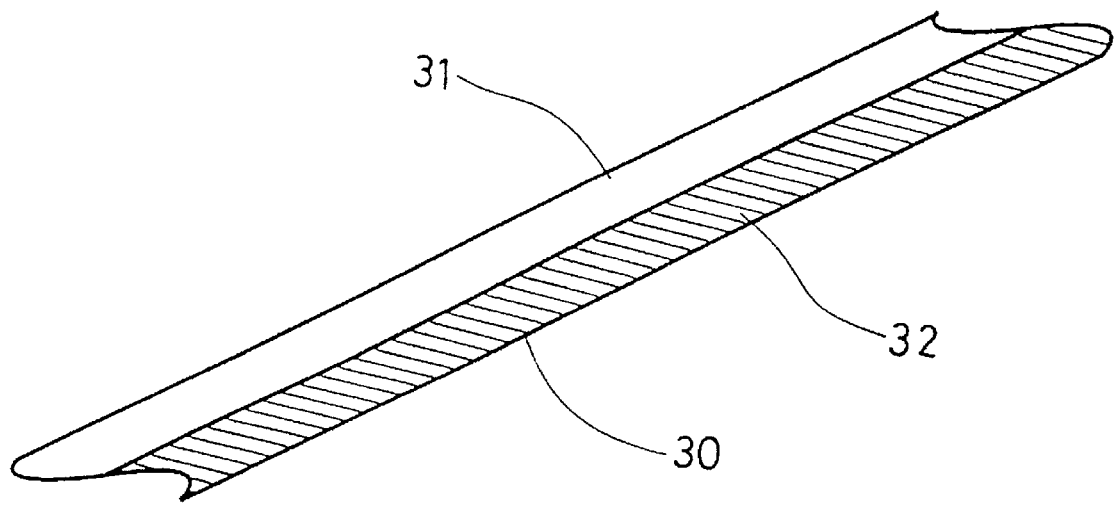
FIG. 6A is a perspective view of a thermal transfer ribbon of another embodiment.

In another method, when it is previously determined that the Braille pattern 11 is necessarily formed at an upper part of the thermal expansile sheet and its notation 12 is also necessarily formed at a lower part of the same, as shown in FIGS. 5A and 5B, a thermal transfer ribbon 30 where two types of ink are coated in such a way so as to be longitudinally divided into two regions. One region 31 is made of ink that is optically absorptive in the range of infrared rays and the other region 32 is made of ink that is not optically absorptive in the range of infrared rays, as shown in FIG. 6A. With this thermal transfer ribbon 30, it is possible to simultaneously form the Braille pattern 11 made of ink optically absorptive in the range of infrared rays and the notation 12 made of ink not optically absorptive in the range of infrared rays.

Figure 6B:
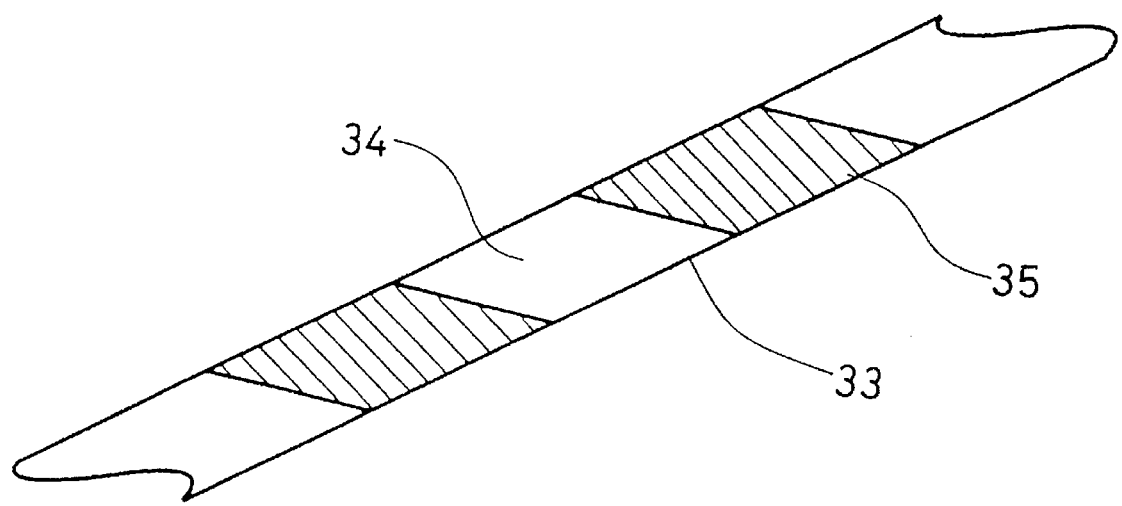
FIG. 6B is a perspective view of a thermal transfer ribbon of another embodiment.

As shown in FIG. 6B, it is also possible to use a thermal transfer ribbon 33 that is alternately coated with a region 34 made of ink that is optically absorptive in the range of infrared rays and a region 35 made of ink that is not optically absorptive in the range of infrared rays in the direction in which the ribbon is fed.

When this thermal transfer ribbon 33 is used, the region 34, made of ink optically absorptive in the range of infrared rays, and the region 35, made of ink not optically absorptive in the range of infrared rays, of the thermal transfer ribbon are detected by the use of a known method and means in a color thermal transfer printer, and the feeding of the thermal transfer ribbon is controlled. As a result, it is easy to form the Braille pattern 11, made of ink being optically absorptive in the range of infrared rays, and the notation 12, made of ink being not optically absorptive in the range of infrared rays, on the thermal expansile sheet 60 or 50.

In one method, the region 34, made of ink optically absorptive in the range of infrared rays, and the region 35, made of ink not optically absorptive in the range of infrared rays, are detected by an optical sensor 84 on the basis of whether the light transmissivity of the thermal transfer ribbon 33 is low or high.

Figure 7:
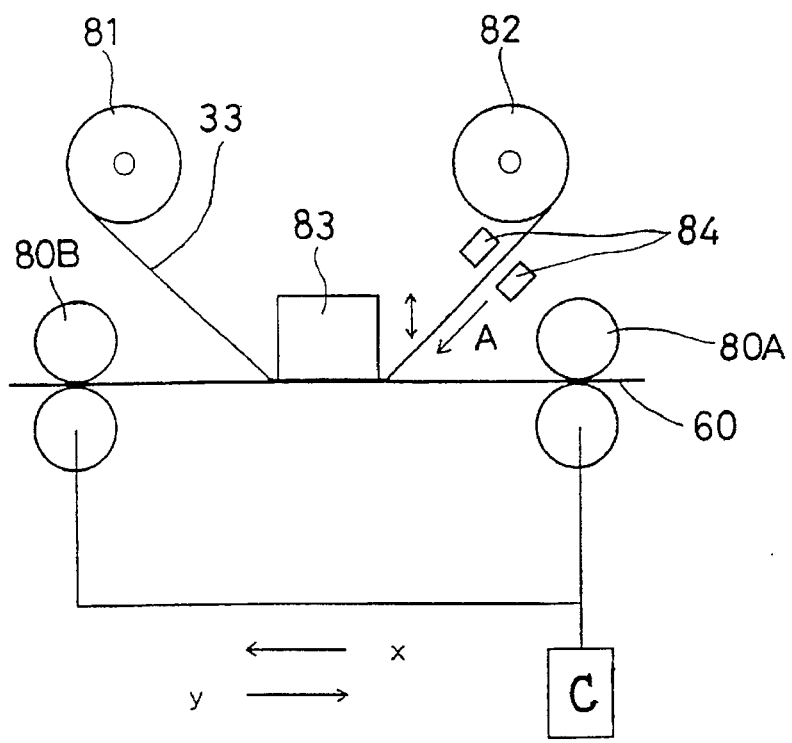
FIG. 7 is an explanatory view illustrating the usage of the thermal transfer ribbon shown in FIG. 6B.

For example, the apparatus shown in FIG. 7 is possible as such a detector 84. The thermal expansile sheet 60 (or 50) can travel back and forth in directions of the arrows X and Y shown in FIG. 7 as a result of the rotation of rollers 80A and 80B. The thermal transfer ribbon 33 is arranged above the thermal expansile sheet 60 (or 50) while one end of the ribbon is wound around a take-up shaft 81 and the other end thereof is wound around a supply roller 82. The thermal transfer ribbon 33 fed from the supply roller 82 in the direction of an arrow A in FIG. 7 is taken up by the take-up shaft 81.

A thermal head 83 is provided between the take-up shaft 81 and the supply roller 82 to print desired characters and Braille patterns on the thermal expansile sheet 60 (or 50) while the thermal transfer ribbon 33 situated between the take-up shaft 81 and the supply roller 82 is brought into contact with the thermal expansile sheet 60 (or 50).

When the optical sensor 84 detects that the region 35, made of ink not optically absorptive in the range of infrared rays, is located in front of the thermal head 83, the notation 12 is printed. Upon completion of the printing of the notation 12, since it is necessary to cause the thermal expansile sheet 60 (or 50) fed in the direction of the arrow X to return to its original position, the thermal head 83 is retracted to an upper position. Then, the thermal expansile sheet 60 (or 50) is returned to its original position by rotation of the rollers 80A and 80B.

Subsequently, the region 34 of the thermal transfer ribbon 34, which is made of ink optically absorptive in the range of infrared rays, is located below the thermal head 83. The thermal transfer ribbon 33 is fed from the supply roller 82 by rotating the take-up shaft 81. The thermal head 83, having been retracted to the upper position, is moved to a lower position, and the printing of the Braille pattern 11 is effected in the same manner as in the case of the notation 12. Thus, both the notation 12 and the Braille pattern 11 can be printed.

FIG. 5B shows a modified example of the thermal expansile sheet shown in FIG. 5A. In addition to the Braille pattern 11 denoting "Urashima Taro" and the hiragana characters notation 12 denoting "Urashima Taro" 12, Chinese characters 13 denoting "Urashima Taro" are formed on the thermal expansile sheet 60, which makes it possible to improve visibility.

Figure 8:
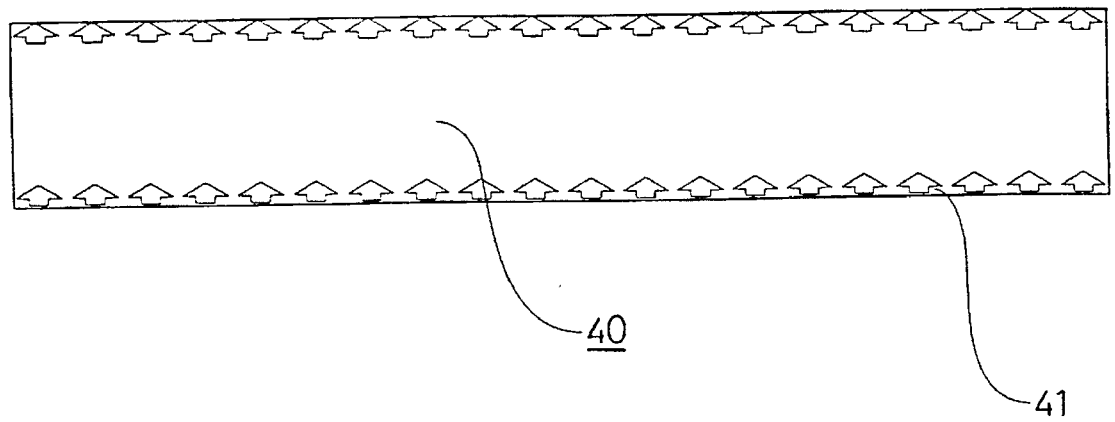
FIG. 8 is an explanatory view of a thermal expansile sheet on which a pattern is previously formed.
Figure 9:
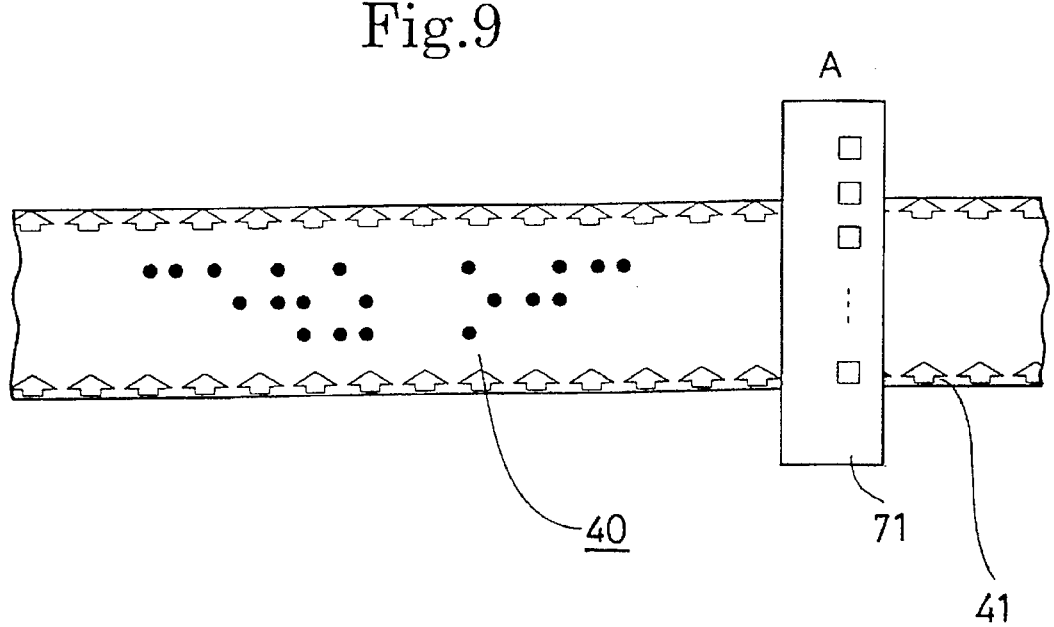
FIG. 9 is an explanatory view illustrating the usage of the thermal expansile sheet on which the pattern is previously formed.

FIG. 8 shows a still further example of the thermal expansile sheet that permits discrimination of the orientation thereof. A pattern 41, in this case symbols indicating direction, is previously printed with ink, which is not optically absorptive in the range of infrared rays. The preprinted pattern serves as the orientation discrimination mechanism on the thermal expansile sheet 40. Such a thermal expansile sheet 40 is arranged such that the upper direction A of a thermal head 71 is matched with the orientation of the pattern 41 as shown in FIG. 9, and a Braille pattern is formed. As a result, even when a user does not have any knowledge of Braille, it is possible for the user to appropriately locate the thermal expansile sheet with reference to the pattern 41. Since the ink is not optically absorptive in the range of infrared rays, it is unnecessary to particularly protect the pattern 41 from light when light irradiation processing is carried out, thereby rendering the processing easy. This pattern 41 is not only obtained by printing but can be formed by thermally transferring ink that is not absorptive in the range of infrared rays onto the thermal expansile sheet 60 using a thermal transfer unit, or the like.

When the thermal expansile sheet produced in the manner as mentioned above is practically used as a sign, it would be better to use the thermal expansile sheet 50 having the adhesive layer 51 as shown in FIG. 2. The adhesive layer 51 is exposed by peeling the release paper 52 on the back of the adhesive layer after an image has been formed, whereby it becomes possible to easily affix the thermal expansile sheet to a desired place.

In this way, according to the thermal expansile sheet of the preferred embodiment, since the sheet is provided with the characters 12 and 13 or the pattern 41 that permit the discrimination of the orientation of the sheet, it is possible for those who have no knowledge of Braille to easily discriminate the orientation of the thermal expansile sheet. This ensures that the thermal expansile sheet is prevented from being arranged upside down.

Although the thermal expansile sheet is explained using the case where the title of a book is represented in Braille by way of example in this embodiment, the thermal expansile sheet can also be used as a sign for other household articles and various articles for domestic use, for example, a box for clothes, a container for cosmetics, or a container for spices and seasoning. Moreover, the thermal expansile sheet can be used not only for Braille patterns but also to form different shapes.

Although the Braille pattern and the characters are formed on the thermal expansile sheet by the use of a thermal transfer unit, they may be formed utilizing other image forming methods and known techniques, for example, electrophotography.

Figure 11:
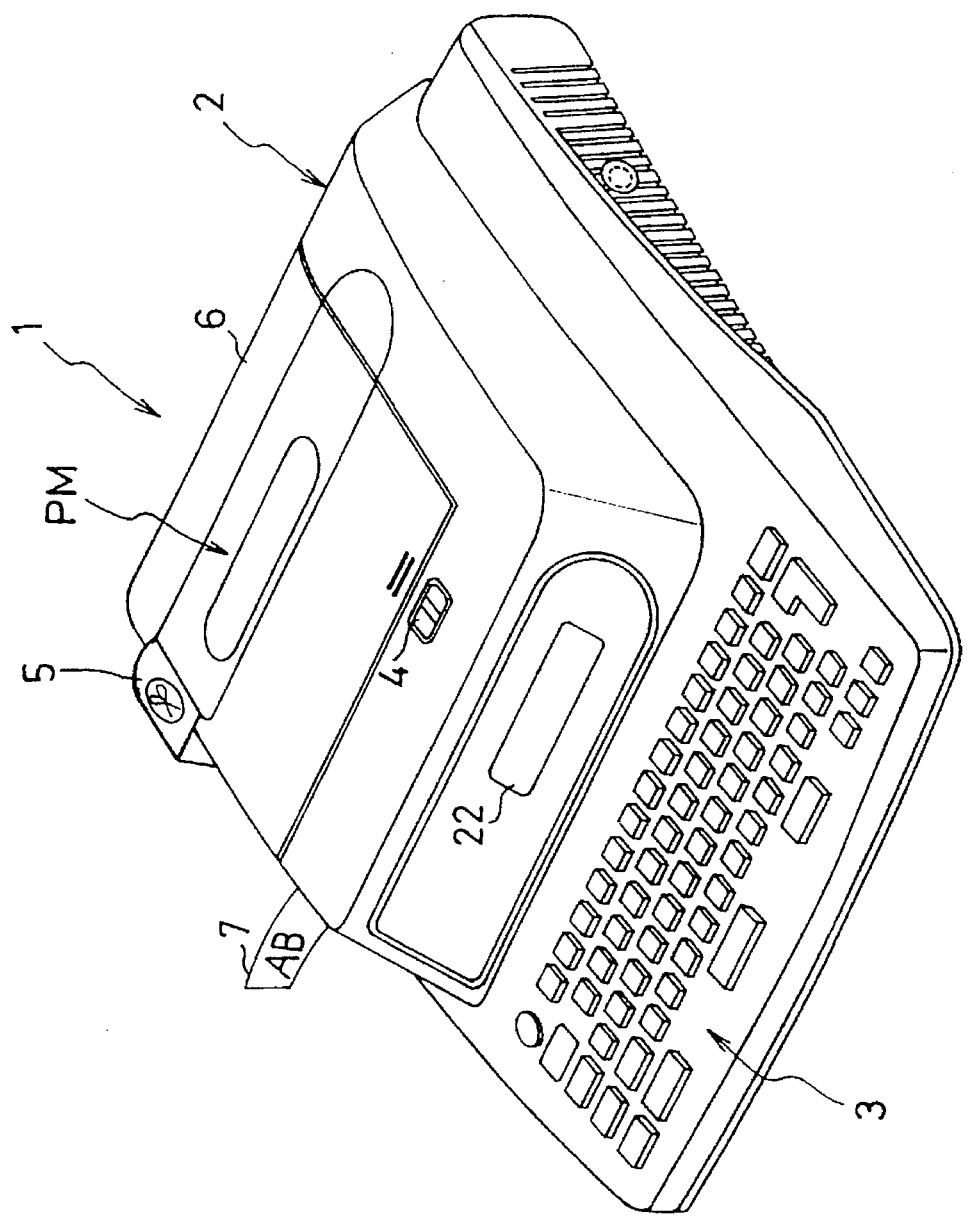
FIG. 11 is a perspective view of a tape printer with which the thermal expansile tape is preferably used.
Figure 12:
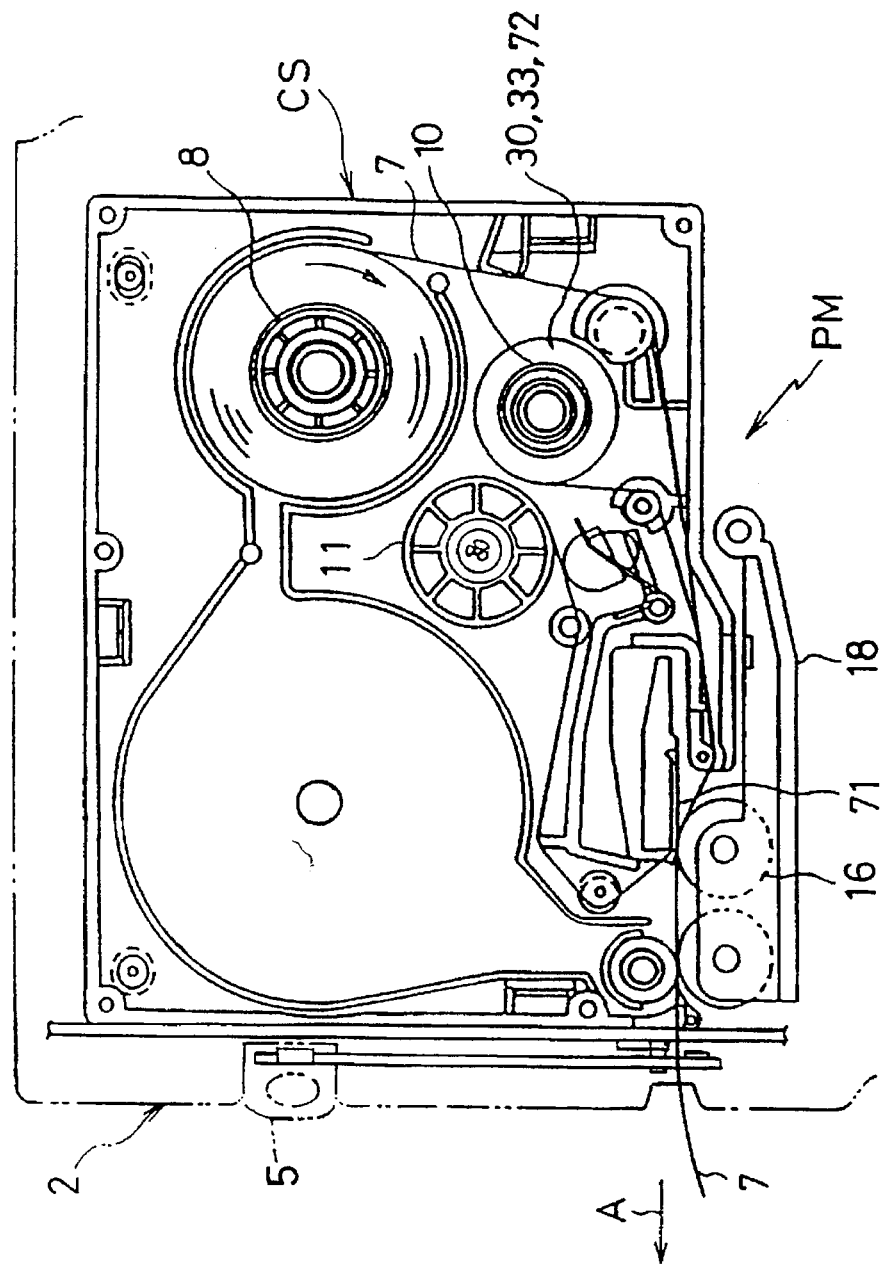
FIG. 12 is an explanatory view of a cassette in which the thermal expansile tape is preferably housed.

The thermal expansile sheet 40, 50, or 60 and the thermal transfer ribbon 30, 33, or 72 of the previous embodiments may be housed in a cassette. Also, the thermal expansile sheet and the thermal transfer ribbon housed in a cassette may be used in a tape printer. Referring to FIGS. 11 and 12, a cassette and a tape printing apparatus that uses the thermal expansile sheet 40, 50, or 60 in the previous embodiments is described.

As shown in FIG. 11, a keyboard 3 is arranged at a front part of a main body frame 2 of a tape printer 1, and a printing mechanism PM is arranged within the main body frame 2 behind the keyboard 3. A liquid crystal display 22, which can display characters and codes for one line, is provided immediately behind the keyboard 3. A release button 4 for releasing a cover frame 6 when a tape cassette CS is inserted into and removed from the printing mechanism PM and a cutting operation button 5 for manually cutting a printed tape are provided on the main body frame 2.

The keyboard 3 is provided with character keys for inputting alphabets, numerals, and codes; a space key; a return key; a cursor shift key for vertically and horizontally moving a cursor K; a size setting key for setting the size of characters to be printed; an execution key for instructing the execution of various processes; a cancel key for canceling preset contents; a print key for instructing printing; and a power key for turning a power supply on and off.

Referring to FIG. 12, the printing mechanism PM will be briefly explained. The tape cassette CS is removably loaded into the printing mechanism PM. This tape cassette CS is provided with a tape spool 8 around which a thermal expansile tape 7, consisting of the tape-like thermal expansile sheet 40, 50 or 60, is wound, with the thermal expansile layer 61 thereof facing inside. The tape cassette CA also has a ribbon supply spool 10 around, which the thermal transfer ribbon 30, 33 or 72 is wound, and a take-up spool 11, which takes up the thermal transfer ribbon 30, 33 or 72.

A thermal head 71 is provided in an upright manner at a position where the thermal expansile tape 7 and the thermal transfer ribbon 30, 33 or 72 overlap. Platen rollers 16, which press the thermal expansile tape 7 and the thermal transfer ribbon 30, 33 or 72 against a thermal head 71, are rotatably attached to a support 18 that is in turn rotatably attached to the main body frame 2. A heat generation element group consisting of 128 individual heat generation elements is vertically provided in a line.

Desired characters and Braille patterns are printed on the thermal expansile layer 61 of the thermal expansile tape 7 by the thermal head 71 via the thermal transfer ribbon 30, 33 or 72. The thermal expansile tape 7 is then fed in the direction of the arrow A and is transported to the outside of the main body frame 2.

The thus obtained thermal expansile tape 7 is cut by the operation of the cutting operation button 5. As with the previous embodiment, the cut thermal expansile tape 7 is exposed to light using the lamp 73, so that an image is formed on the thermal expansile tape 7.

It is to be understood that the present invention is not restricted to the particular forms shown in the foregoing preferred embodiments. Various modifications and alternations can be made thereto without departing from the scope of the inventions encompassed by the appended claims.

What is claimed is:

1. A thermal expansile sheet comprising:

a base layer having a surface, the base layer exhibiting properties of smoothness, water resistance, tensile strength and rigidity;

a foaming layer disposed on the surface of said base layer and having an outer surface with an image formed thereon, said foaming layer including a foaming material that generates gas upon heating thus expanding the foaming layer where the image is formed and creating a raised image thereon, wherein the raised image is a Braille pattern; and an orientation discriminating mechanism on said foaming layer to indicate an orientation of the raised image on said thermal expansile sheet, wherein said orientation discriminating mechanism is one of a character and a symbol indicating the orientation of the raised image.

2. The thermal expansile sheet according to claim 1, wherein the desired image on said foaming layer is formed of a material having high absorption of light and generating heat upon absorption of light.

3. The thermal expansile sheet according to claim 2, wherein the image on said foaming layer is optically absorptive in a range of infrared rays.

4. The thermal expansile sheet according to claim 2, wherein the image and said orientation discriminating mechanism are formed on said foaming layer by a thermal transfer method.

5. The thermal expansile sheet according to claim 4, wherein the image is formed of an ink that is optically absorptive in a range of infrared rays and said orientation discriminating mechanism is formed of an ink that is optically non-absorptive in a range of infrared rays.

6. The thermal expansile sheet according to claim 4, wherein only the image on said foaming layer is exposed to light.

7. The thermal expansile sheet according to claim 4, wherein said orientation discriminating mechanism is not optically absorptive upon exposure to light and said foaming layer does not expand at areas corresponding to said orientation discriminating means upon exposure to light.

8. The thermal expansile sheet according to claim 1, wherein said foaming material is a foaming agent including at least one of bicarbonate, peroxide and azo compound.

9. The thermal expansile sheet according to claim 8, wherein said bicarbonate includes sodium bicarbonate, and said azo compound includes one of diazoaminobenzene, aluminum paradicarboxylate and azobisisobutyronitrile.

10. The thermal expansile sheet according to claim 9, wherein said base layer is formed of a material including at least one of paper, synthetic paper, and plastic film.

11. The thermal expansile sheet according to claim 1, wherein said foaming material is a thermal expansile microcapsule encapsulating a volatile substance.

12. The thermal expansile sheet according to claim 11, wherein said encapsulated volatile substance includes one of propane and butane, and said microcapsule has a shell including one of polystyrene, polyvinyl chloride, polyvinylidene chloride, polyvinyl acetate, polyacrylic ester, polyacrylonitrile, polybutadiene and copolymers thereof.

13. The thermal expansile sheet according to claim 12, wherein said base layer is formed of a material including at least one of paper, synthetic paper, and plastic film.

14. The thermal expansile sheet according to claim 1, further comprising an adhesive layer formed on an opposed surface opposite to said surface of said base layer and a releasing layer formed on said adhesive layer.

15. The thermal expansile sheet according to claim 1, wherein said thermal expansile sheet is formed as a tape that is wound around a spool provided in a tape cassette.

16. The thermal expansile sheet according to claim 1, wherein said orientation discriminating mechanism is a character.

17. The thermal expansile sheet according to claim 28, wherein the character indicates a meaning of the Braille pattern.

18. The thermal expansile sheet according to claim 1, wherein said orientation discriminating mechanism is a symbol.

* * * * *